United States Patent [19]

Wilde

[11] 3,820,981

[45] June 28, 1974

[54] HARDENABLE ALLOY STEEL

[75] Inventor: Robert F. Wilde, Horseheads, N.Y.

[73] Assignee: Corning Glass Works, Corning, N.Y.

[22] Filed: Feb. 24, 1969

[21] Appl. No.: 801,798

[52] U.S. Cl............................................. 75/126 C
[51] Int. Cl............................................ C22c 39/14
[58] Field of Search.......... 75/126 D, 126 F, 126 H, 75/128 G, 126 C, 128 B

[56] References Cited
UNITED STATES PATENTS

| | | | |
|---|---|---|---|
| 2,590,835 | 4/1952 | Kirkby | 75/126 H |
| 2,880,085 | 3/1959 | Kirkby | 75/126 F |
| 2,905,577 | 9/1959 | Harris | 75/126 R |
| 2,985,529 | 5/1961 | Harris | 75/126 H |
| 3,235,417 | 2/1966 | Roy | 75/128 B |

*Primary Examiner*—Hyland Bizot
*Attorney, Agent, or Firm*—Clarence R. Patty, Jr.; Richard N. Wardell

[57] ABSTRACT

Hardenable 14–16 percent chromium heat-resistant steel containing cobalt, silicon, molybdenum and tungsten in a special balanced composition for extended high temperature service life. May also contain manganese, nickel, vanadium, and boron. Heat treated by austenitizing, air hardening and tempering. Martensitic structure tempered above 1,100°F. is free of any detrimental delta ferrite, sigma phase, coalesced carbide network and retained austenite. Useful as precision cast articles of equipment for handling, forming or otherwise contacting hot plastic or molten glass in the manufacture of glassware.

10 Claims, No Drawings

HARDENABLE ALLOY STEEL

BACKGROUND OF THE INVENTION

High chromium steels of the hardenable martensitic type (also variously termed stainless, corrosion-resistant and heat-resistant steels) have long been advocated for use as appliances or parts employed in handling, forming or otherwise contacting hot plastic or molten glass in the manufacture of glassware. Some early examples of these steels and reasons for their use as articles of glass working apparatus are described in U.S. Pat. Nos. 1,449,789, 1,996,152, 2,035,364 and 2,057,892. More recently, the 12 percent chromium hardenable martensitic steels of the AISI type 420 and ACI type CA-40, and strengthened modifications of these two types, have been used widely in the glass industry because of their apparent performance superiority heretofore in service life and cost.

However, there has been a strong desire for further performance improvements in such steels for glass pressing molds and other articles of equipment for handling, forming or otherwise contacting hot plastic or molten glass (all of which are hereinafter simply referred to as "glass forming parts"). Presently, glass forming parts commonly attain surface temperatures of about 1,300°F. or so. This means that such steel part should be tempered at about or somewhat above 1,300°F., and it is the structure and properties of the steel tempered at or above about 1,300°F. that are determinative of whether an improved steel has been attained for glass forming parts.

One desired improvement has been increased oxidation-corrosion resistance at elevated temperatures over that of the 12 percent chromium hardenable steels so as to impart good surface qualities to glassware for longer periods of time before requiring surface refinishing. While an increase in chromium can give an improvement in oxidation-corrosion resistance, it also tends to unbalance the composition toward yielding an unstable microstructure and the formation of sigma phase or delta ferrite. The former results in embrittlement, and the latter adversely affects high temperature strength properties and decreases resistance to thermal fatigue, which in turn results in increased susceptibility to surface cracking or heat checking at a much shorter period of service life.

Other improvements greatly desired are higher elevated temperature strength for yielding longer service life without surface cracking and higher hardness for improved abrasive wear resistance in the steel. While changes in carbon content or additions of various alloying constituents have hitherto been employed for altering strength and hardness properties, none of the previous hardenable high chromium steels have given, from my experience and judgment, the necessary improvements desired without at least also incurring some other deleterious deficiency. For example, higher carbon content for increasing tempered hardness also leads to typical retained austenite problems after hardening and/or excessive hypereutectoid carbide present as a eutectic, or as precipitation that coalesces to form a continuous matrix network phase in the grain boundaries of the metallurgical structure. The latter situation results in severely decreased ductility and increased susceptibility to brittle fracture. Additions of other alloying constituents intended for high temperature strengthening or other purposes may actually work a serious disadvantage of producing an unstable metallurgical structure containing some detrimental additional phase such as delta ferrite, retained austenite, sigma phase, Laves phase or chi phase.

SUMMARY OF THE INVENTION

My invention is the discovery of an improved high chromium, deeply hardenable alloy steel having a special balanced composition that yields, upon tempering above 1,100°F., a metallurgical structure which is stable at temperatures up to 1,350°F., is substantially free of delta ferrite, is free of sigma phase, is substantially free of detrimental coalesced network carbides, is free of retained austenite, and exhibits greatly increased strength properties at room and elevated temperatures up to 1,300°F. By virtue of a higher chromium content, my new steel also possesses greater oxidation-corrosion resistance than the 12 percent chromium steels widely used heretofore for glass forming parts. As a result of these combined desirable characteristics, the new steel is capable of greater service life with substantially lessened frequency of surface refinishing or replacement of glass forming parts made therefrom.

Broadly, my new alloy steel consists essentially of, by weight, 0.20 to 0.35 percent carbon, 3.0 to 6.0 percent cobalt, 0 to 3.0 percent manganese, 0 to 3.5 percent nickel, 0 to 0.1 percent nitrogen, 14.0 to 16.0 percent chromium, 0.1 to 1.5 percent silicon, 0.5 to 4.5 percent molybdenum, 0.3 to 2.5 percent tungsten, 0 to 1.0 percent vanadium, 0 to 0.02 percent boron, balance iron and incidental impurities in ordinary amounts, and the weight percentages of the aforesaid elements proportioned to characterize the steel with interrelated nickel and chromium equivalents determined in accordance with the following formulas:

chromium equivalent = (% Cr) + 2(%Si) + 1.5(%Mo) + 0.75(%W) + 5(%V) + 1.75(%Nb) = 19 to 29%, and nickel equivalent = 30(%C) + (%Co) + 0.5(%Mn) + (%Ni) + 25(%$N_2$) = 11 to 18%, but not less than 0.7143 (chromium equivalent) − 3.286.

The specially balanced character, and particularly the maximum limit of 16.0% on the chromium content, of this steel composition assures avoidance of detrimental delta ferrite formation or sigma phase. In the most extreme occasional case within my broad composition area, delta ferrite is less than 10 percent. No sigma phase has been detected. While an increase of chromium beyond 16.0 percent might seem advantageous for oxidation-corrosion resistance, I have found that it will cause the excessive delta ferrite formation and associated adverse effect on properties previously referred to.

The use of cobalt as a prominent constituent in my steel is also critical to the improved properties. Cobalt does not depress the $M_s$ temperature as severely as other austenite-promoting alloying elements, such as nickel. As a result, austenite is fully transformed to martensite upon hardening and tempering above 1,100°F. I have found that excessive cobalt content (e.g. 10 percent) produces a severe, undesirable, blue cobalt oxide stain on opaque or translucent glassware. It is, therefore, important that the cobalt content does not exceed 6 percent.

The limitations on the carbon content of my steel are also very important for the improved properties. The minimum of 0.20 percent is essential, in combination with the other constituents, for obtaining the improved strength and hardening characteristics. It is critical that the carbon does not exceed 0.35 percent because otherwise excessive carbon content will result in the formation of a larger amount of hypereutectoid carbides, which forms a detrimental grain boundary network that severely reduces ductility.

Considered as a whole, the specified porportioning and balancing of all the constituents of my steel are essential to obtaining the improved characteristics and especially to the improved high temperature strength properties. The elements involved in determining the nickel equivalent tend to promote formation of austenite, while the elements involved in determining the chromium equivalent tend to promote formation of ferrite and carbides. Their critical balancing avoids undesirable structures that have adverse effects on properties. For example, the maximum nickel equivalent is very important in obtaining a hardenable martensitic alloy, and the maximum chromium equivalent and the minimum nickel equivalent are crucial for avoiding detrimental delta ferrite and carbide network formation.

It should be further noted that certain additional benefits may be gained by optional alloy additions. For example, the inclusion of at least 0.003 percent boron decreases the tendency for grain boundary carbides to coalesce, thereby improving ductility. At least 1.2 percent manganese is desirable in my alloy steel when it is to be formed into articles by casting. Also, at least 0.1 percent vanadium is deemed desirable when the alloy steel is to be employed in glass forming parts.

For the distinct advantage of producing an improved stable alloy steel yielding a hardened and tempered structure free of or with little (less than 5 percent) delta ferrite and without any significant amount of coalesced carbides, an alloy steel of my invention should consist essentially of, by weight, 0.20 to 0.33 percent carbon, 3.7 to 5.0 percent cobalt, 0 to 2.0 percent manganese, 0 to 3.0 percent nickel, 0.08 percent maximum nitrogen, 14.5 to 15.5 percent chromium, 0.1 to 1.0 percent silicon, 0.7 to 3.6 percent molybdenum, 0.5 to 2.0 percent tungsten, 0 to 0.7 percent vanadium, 0 to 0.02 percent boron, 0.025 percent maximum sulfur, 0.03 percent maximum phosphorus, balance iron and incidental impurities, and the weight percentages of the aforesaid elements proportioned to characterize the steel with interrelated nickel and chromium equivalents determined in accordance with the following formulas:

chromium equivalent = (%Cr) + 2(%Si) + 1.5(%Mo) + 0.75(%W) + 5(%V) + 1.75(%Nb) = 20 to 27%, and nickel equivalent = 30(%C) + (%Co) + 0.5(%Mn) + (%Ni) + 25(%N$_2$) = 14 to 17% (or even to 18%), but not less than 0.7143 (chromium equivalent) − 2.286.

The structural characteristics of this alloy steel, when tempered above 1,100°F., assure improvement in high temperature strength and especially in stress-rupture strength at 1,300°F. that provides longer service life to a glass forming part without heat checking.

Especially desirable alloy steel of my invention consists essentially of, by weight, 0.24 to 0.32 percent carbon, 4.1 to 4.9 percent cobalt, 1.2 to 1.8 percent manganese, 0.8 percent maximum nickel, 0.08 percent maximum nitrogen, 14.5 percent to 15.5 percent chromium, 0.2 to 0.8 percent silicon, 1.2 to 1.8 percent molybdenum, 0.6 to 1.2 percent tungsten, 0.2 to 0.7 percent vanadium, 0 to 0.02 percent boron, 0.025 percent maximum sulfur, 0.03 percent maximum phosphorus, balance iron and incidental impurities, and the aforesaid elements proportioned to provide chromium equivalent (as defined above) = 20 to 27 percent and nickel equivalent (as defined above) = 14 to 17 percent, but not less than 0.7143 (chromium equivalent) − 2.286. This steel of my invention is the least sensitive to variation in chemical composition (within the above noted ranges) causing variation in properties.

Especially excellent alloy steel of my invention, exhibiting outstanding strength characteristics upon hardening and tempering above 1,100°F., consists essentially of, by weight, 0.20 to 0.27 percent carbon, 4.1 to 4.9 percent cobalt, 1.2 to 1.8 percent manganese, 2.1 to 2.9 percent nickel, 0.08 percent maximum nitrogen, 14.5 to 15.5 percent chromium, 0.2 to 0.8 percent silicon, 3.0 to 3.6 percent molybdenum, 1.3 to 1.9 percent tungsten, 0.1 to 0.6 percent vanadium, 0 to 0.02 percent boron, 0.025 percent maximum sulfur, 0.03 percent maximum phosphorus, balance iron and incidental impurities, and the aforesaid elements proportioned to yield chromium equivalent (as defined previously) = 20 to 27 percent and nickel equivalent (as defined previously) = 14 to 17 percent, but not less than 0.7143 (chromium equivalent) − 2.286.

Preparation of my new alloy steel and of articles made thereof can be any of the well-known conventional methods employed for hardenable high chromium steels. For example, the steel may be prepared by either electric arc or induction melting procedures. If desired, melting can be carried out in a vacuum or under an atmosphere of inert gas. The articles can be formed either by casting or by hot working ingot stock. However, I prefer to employ the known techniques of precision casting for making glass forming parts so as to eliminate the expensive machining operations required for articles made by sand casting or hot working. While alloying element segregation tends to be a problem in casting large section thicknesses, good results can be attained for section thicknesses up to two inches or so, which is adequate for a broad range of part designs. Although some special mold chill is advisable for cast section thicknesses of about one inch or more, I have found that section thicknesses of up to ¾ inch can be successfully cast without special chill and without segregation problems.

Heat treatment of my steel involves the usual pattern of steps and conditions (including austenitizing, hardening and tempering) employed hitherto for hardenable high chromium steels. Some details of practices that I have found quite suitable for my steel are noted below by way of illustration but not of limitation.

For cast parts, I prefer to initially subject them to a homogenization and structure refining treatment. This can be accomplished by heating at about 1,650° to 1,800°F. or so for up to about two or more hours followed by air cooling. As a desirable, but optional, second step in this initial treatment, the air cooled part is heated at about 1,100° to 1,375°F. to effect a tempered homogenized structure prior to beginning the austenitizing treatment.

Austenitizing is preferably begun with a preheating or conditioning step (especially for a homogenized cast part that is not given the second or tempering step noted above in the homogenization treatment), which suitably involves heating to an intermediate temperature of about 1,200° to 1,375°F. for up to about one-half hour or so. Then the steel part is further heated from the conditioning temperature up to an austenitizing temperature of about 1,650° to 1,850°F. or so for up to one-half hour or more. Excessively high austenitizing temperatures should be avoided because the austenite will become "stabilized" and will not readily transform to a desirable structure during subsequent heat treatment procedure. The austenitizing temperature range, is therefore, intentionally chosen, for most desirable results, to bring the steel into the two-phase austenite-plus-carbide field rather than into the single phase austenite field or into the two-phase austenite-plus-ferrite field.

Hardening is accomplished simply by air cooling from the austenitizing temperature. Of course, oil quenching or forced air cooling can be optionally employed.

Finally, the hardened steel part is subjected to a tempering treatment and preferably to a multiple tempering sequence. This is accomplished by heating to a temperature between about 1,100°F. and 1,400°F. for up to 2 hours or more, air cooling, and then repeating these heating and air cooling steps. Tempering above 1,400°F. may result in partial reversion to austenite in the more highly alloyed embodiments of my steel, and is therefore to be avoided.

While the foregoing heat treatment procedure is especially applicable to the manufacture of glass forming parts from my steel, this same steel may also be employed for other uses by selecting an appropriate heat treatment. For example, my steel with a heat treatment substantially as described above can be employed in parts of metal die casting apparatus. As another example, my steel may be employed to make dies by multiple tempering at temperatures of about 400° to 750°F. However, prior to this lower temperature tempering, it is desirable to subject the steel to a refrigeration or sub-zero (below 0°F.) treatment at a temperature down to about −100°F. to transform any retained austenite that would have otherwise been eliminated by the higher tempering temperature employed for glass forming parts.

DESCRIPTION OF THE PREFERRED EMBODIMENTS

Table I sets forth the analyses (in weight percent) of 10 exemplary alloy steels according to the present invention which were heat treated as follows: normalized at 1,750°F. for 2 hours, air cooled, conditioned at 1,250°F. for one-half hour, further heated to 1,750°F. for one-half hour, air cooled, tempered at least twice at 1,350°F. for 2 hours on each cycle and air cooled after each tempering cycle.

Table I also sets forth the general analyses (in weight percent) of a modified AISI type 420 steel commonly employed heretofore for glass forming parts and a commercially available hardenable, higher chromium AISI type 440A steel experimentally investigated for glass forming parts, which steels were heat treated as follows: annealed at 1,650°F. for 5 hours, furnace cooled at 50°F. per hour to 1100°F. and thereafter air cooled, austenitized at 1,850°F. for 5 hours, air cooled, double tempered at 1,325°F. for 7 hours on the first cycle and 8 hours on the second cycle and air cooled after each tempering cycle. These heat treatments, as given to these two prior art steels, are in accordance with standard practice for their application at high temperature.

Two other factors concerning the data in Table I should be noted. In all cases where Fe is indicated to be the balance of the composition, that is meant to include the incidental impurities that were present in normal permitted amounts, e.g., 0.025 percent max. S and 0.03 percent max. P. The minimum Ni equivalent data is based upon the more desired formulation of it being equal to at least 14 percent, but not less than 0.7143 (chromium equivalent) − 2.286. Thus, despite the nickel equivalent of steels C6 Nb, C9 and C10B being lower than the indicated minimums, they are within the

TABLE I

| STEEL | C1 | C5 | C5NB | C6 | C6NB | C9 | C10 | C10B | C11 | C12 | Mod. 420 | 440A |
|---|---|---|---|---|---|---|---|---|---|---|---|---|
| C | 0.32 | 0.29 | 0.29 | 0.24 | 0.24 | 0.26 | 0.26 | 0.28 | 0.26 | 0.25 | .30–.40 | .60–.75 |
| Co | 4.48 | 4.40 | 4.40 | 4.40 | 4.40 | 4.20 | 4.10 | 3.96 | 4.20 | 4.53 | — | — |
| Mn | 1.59 | 1.67 | 1.67 | 1.25 | 1.25 | 1.45 | 1.40 | 1.62 | 1.45 | 1.50 | 1.00 max. | 1.00 max. |
| Ni | <0.2 | — | — | 2.50 | 2.50 | 0.05 | 2.20 | 1.96 | 2.20 | 2.67 | 0.50 max. | — |
| $N_2$ | 0.06 | 0.06 | 0.05 | 0.06 | 0.06 | 0.02 | 0.04 | 0.03 | 0.05 | 0.03 | — | — |
| Cr | 14.9 | 15.2 | 15.2 | 15.4 | 15.4 | 15.0 | 14.6 | 15.2 | 15.1 | 14.7 | 12–14 | 16–18 |
| Si | 0.54 | 0.57 | 0.57 | 0.43 | 0.43 | 0.30 | 0.38 | 0.88 | 1.04 | 0.49 | 0.75 max. | 1.00 max. |
| Mo | 1.15 | 1.30 | 1.30 | 3.30 | 3.30 | 1.12 | 3.20 | 3.20 | 3.20 | 3.05 | .90–1.10 | 0.75 max. |
| W | 0.76 | 0.90 | 0.90 | 1.30 | 1.30 | 0.90 | 0.80 | 0.89 | 0.80 | 1.57 | — | — |
| V | 0.53 | 0.63 | 0.63 | 0.55 | 0.55 | 0.65 | 0.65 | 0.68 | 0.65 | 0.25 | .60–.80 | — |
| Nb | — | — | 1.05 | — | 1.13 | — | — | — | — | — | — | — |
| B | trace | trace | trace | trace | trace | trace | trace | 0.003 | trace | trace | — | — |
| Fe | bal. | bal. | bal. | bal. | bal. | bal. | bal. | bal. | bal. | bal. | bal. | bal. |
| Cr Eq. | 20.9 | 22.1 | 24.0 | 24.9 | 26.9 | 21.2 | 24.0 | 25.8 | 25.8 | 22.7 | ca. 18 | ca. 19 |
| Ni Eq. | 16.4 | 15.4 | 15.2 | 16.2 | 16.2 | 13.3 | 15.8 | 15.9 | 16.2 | 16.2 | ca. 12 | ca. 22 |
| Min. Ni Eq. | 14.0 | 14.0 | 14.9 | 15.5 | 16.9 | 14.0 | 14.9 | 16.2 | 16.2 | 14.0 | ca. 10.6 | ca. 11.3 | broadest invention definition where the Ni equivalent is equal to at least 11 percent, but not less than 0.7143 (chromium equivalent) − 3.286.

Ten of the heat treated steels of Table I were tested to determine the average values of their Rockwell C hardness ($R_c$) at room temperature, and their yield strength in psi at 0.2 percent offset (0.2 YS), ultimate tensile strength in psi (UTS) and percent elongation in a 1 inch span (% EL) at three different temperatures. The data resulting from these tests are shown in Table II and point up the evident strength superiority of steel according to my invention. Steels C6 and C12 are illustrative of the optimum composition area for the greatest advantage in both strength and address, which is gained from the higher contents of nickel, molybdenum and tungsten. Steel C5 is illustrative of the composition area less sensitive to compositional variation from heat to heat of steel.

TABLE II

| STEEL | $R_c$ | 0.2YS | UTS | % EL |
|---|---|---|---|---|
| | | At Room Temperature | | |
| C5 | 24 | 92,500 | 129,000 | 13 |
| C5Nb | 22 | 93,000 | 122,000 | 10 |
| C6 | 32 | 107,000 | 159,000 | 8 |
| C6Nb | 34 | 116,000 | 151,000 | 4 |
| C9 | 24 | 80,900 | 111,000 | 17 |
| C10 | 33 | 103,600 | 147,000 | 7 |
| C11 | 33 | 100,500 | 145,500 | 6 |
| C12 | 36 | 115,000 | 173,000 | 5 |
| Mod. 420 | 22–25 | 79,400 | 113,500 | 16 |
| 440A | 22–25 | 78,600 | 113,300 | 18 |
| | | At 1100°F. | | |
| C9 | — | 45,300 | 55,500 | 27 |
| C12 | — | 73,000 | 88,000 | 18 |
| Mod. 420 | — | 35,500 | 43,800 | 39 |
| 440A | — | 43,200 | 50,500 | 21 |
| | | At 1300°F. | | |
| C9 | — | 19,800 | 26,100 | 28 |
| C10 | — | 21,900 | 33,800 | 36 |
| C12 | — | 31,400 | 48,000 | 39 |
| Mod. 420 | — | 17,300 | 25,500 | 59 |
| 440A | — | 16,900 | 23,800 | 63 |

Eight steels of this invention shown in Table I and the modified AISI type 420 steel, each in its indicated heat treated condition, were also subjected to stress-rupture testing at 1,300°F. to determine the constantly applied load in psi that would cause failure in 10 hours and 100 hours of test life or duration. The data resulting from these tests are shown in Table III.

TABLE III

Stress - Rupture Properties at 1300°F.

| STEEL | Stress for 10 Hours Life | Stress for 100 Hours Life |
|---|---|---|
| C5 | 16,000 | 12,000 |
| C5Nb | 16,000 | 12,000 |
| C6 | 28,500 | 24,000 |
| C6Nb | 21,500 | 18,000 |
| C9 | 12,500 | 8,500 |
| C10 | 18,000 | 14,500 |
| C11 | 16,000 | 12,000 |
| C12 | 28,500 | 24,000 |
| Mod. 420 | 10,000 | 6,500 |

The stress-rupture superiority of the steels according to the present invention is readily apparent from the data in Table III. Moreover, once again steels C6 and C12 are illustrative of the optimum composition area for high temperature strength characteristics provided by the higher contents of nickel, molybdenum and tungsten. Steel C9 exhibits only a very modest improvement in properties mainly due to the fact that its nickel equivalent is lower than the more desirable minimum nickel equivalent described above.

The three steels set forth in Table IV (with analyses in weight percent), none of which are within my invention, illustrate the critical character of my balanced composition requirements. They were given a heat treatment substantially similar to that of the previous examples of my invention. No mechanical property testing was performed on these three heat treated steels because microstructural analysis of them gave evident indication of their poor property characteristics. The minimum nickel equivalent values in Table IV are based upon the general requirement that the minimum nickel equivalent be at least 11 percent, but not less than 0.7143 (chromium equivalent) − 3.286.

Steel C2 exhibited an excessive amount of about 30 percent delta ferrite. As can be seen from Table IV, the minimum nickel equivalent necessary for good structure and properties in Steel C2 is 17.5 percent. However, the actual nickel equivalent in Steel C2 was only 16.5 percent.

TABLE IV

| | C2 | C3 | C4 |
|---|---|---|---|
| C | 0.33 | 0.36 | 0.35 |
| Co | 4.30 | 4.30 | 4.17 |
| Mn | 1.59 | 1.53 | 1.64 |
| Ni | <0.20 | 2.25 | 2.26 |
| N | 0.06 | 0.06 | 0.09 |
| Cr | 16.0 | 15.7 | 17.8 |
| Si | 0.70 | 0.72 | 0.80 |
| Mo | 3.90 | 3.70 | 3.85 |
| W | 1.76 | 1.66 | 1.70 |
| V | 0.91 | 0.89 | 0.89 |
| Fe* | bal. | bal. | bal. |
| Ni Equiv. | 16.5 | 19.6 | 20.0 |
| Cr Equiv. | 29.1 | 28.4 | 30.9 |
| Min. Ni Equiv. | 17.5 | 17.0 | 18.8 |

*Includes incidental impurities in normal permitted amounts.

Steel C3 exhibited a substantial amount of excessive carbides coalesced into a continuous grain boundary network. This is the result of the excessive carbon content and of the relatively high chromium equivalent in this steel as compared to my new steel.

Steel C4 exhibited about 10 percent of delta ferrite and about 20 percent of very coarse coalesced carbide network. In this case, both the nickel and chromium equivalents exceeded those limits necessary for good structure and properties, as specified for my new steel.

I claim:

1. Alloy steel being hardenable by transformation of austenite to martensite upon at least air cooling from austenitizing temperature, containing less than 10 percent ferrite, and consisting essentially of, by weight, 0.20 to 0.35 percent carbon, 3 to 6 percent cobalt, 0 to 3 percent manganese, 0 to 3.5 percent nickel, 0 to 0.1 percent nitrogen, 14 to 16 percent chromium, 0.1 to 1.5 percent silicon, 0.5 to 4.5 percent molybdenum, 0.3 to 2.5 percent tungsten, 0 to 1 percent vanadium, 0 to 0.02 percent boron, balance iron and incidental impurities, and the weight percentages of the aforesaid elements proportioned to characterize said steel with interrelated nickel and chromium equivalents determined in accordance with the following formulas:

chromium equivalent = (% Cr) + 2(% Si) + 1.5(% Mo) + 0.75(% W) + 5(% V) + 1.75(% Nb) = 19 to 29 percent, and nickel equivalent = 30(% C) + (% Co) + 0.5(%Mn) + (%Ni) + 25(% N$_2$) = 11 to 18%, but not less than 0.7143 (chromium equivalent) − 3.286.

2. Alloy steel of claim 1 wherein boron is at least 0.003 percent.

3. Alloy steel of claim 1 wherein manganese is at least 1.2 percent.

4. Alloy steel of claim 1 wherein vanadium is at least 0.1 percent.

5. Alloy steel of claim 1 wherein carbon is not more than 0.33 percent, cobalt is 3.7 to 5 percent, manganese is not more than 2 percent, nickel is not more than 3 percent, maximum nitrogen is 0.08 percent, chromium is 14.5 to 15.5 percent, silicon is not more than 1 percent, molybdenum is 0.7 to 3.6 percent, tungsten is 0.5 to 2 percent, vanadium is not more than 0.7 percent, maximum sulfur is 0.025 percent, maximum phosphorus is 0.03 percent, chromium equivalent is 20 to 27 percent, and nickel equivalent is 14 to 17 percent, but not less than 0.7143 (chromium equivalent) − 2.286.

6. Alloy steel of claim 5 wherein boron is at least 0.003 percent.

7. Alloy steel of claim 5 wherein manganese is at least 1.2 percent.

8. Alloy steel of claim 5 wherein vanadium is at least 0.1 percent.

9. Alloy steel of claim 5 wherein carbon is 0.24 to 0.32 percent, cobalt is 4.1 to 4.9 percent, manganese is 1.2 to 1.8 percent, maximum nickel is 0.8 percent, silicon is 0.2 to 0.8 percent, molybdenum is 1.2 to 1.8 percent, tungsten is 0.6 to 1.2 percent and vanadium is at least 0.2 percent.

10. Alloy steel of claim 5 wherein carbon is not more than 0.27 percent, cobalt is 4.1 to 4.9 percent, manganese is 1.2 to 1.8 percent, nickel is 2.1 to 2.9 percent, silicon is 0.2 to 0.8 percent, molybdenum is at least 3 percent, tungsten is 1.3 to 1.9 percent and vanadium is 0.1 to 0.6 percent.

* * * * *